United States Patent
Marechal et al.

(10) Patent No.: US 10,018,967 B2
(45) Date of Patent: *Jul. 10, 2018

(54) MAGNETIC AND/OR ELECTROSTATIC PIVOT

(71) Applicant: Montres Breguet S.A., L'Abbaye (CH)

(72) Inventors: Sylvain Marechal, Bois-d'Amont (FR); Davide Sarchi, Renens (CH); Olivier Karlen, Blonay (CH); Arnaud Todeschini, Les Charbonnieres (CH)

(73) Assignee: Montres Breguet S.A., L'Abbaye (CH)

( * ) Notice: Subject to any disclaimer, the term of this patent is extended or adjusted under 35 U.S.C. 154(b) by 603 days.

This patent is subject to a terminal disclaimer.

(21) Appl. No.: 14/667,040

(22) Filed: Mar. 24, 2015

(65) Prior Publication Data
US 2015/0234361 A1 Aug. 20, 2015

Related U.S. Application Data

(62) Division of application No. 13/290,544, filed on Nov. 7, 2011, now Pat. No. 9,030,070.

(30) Foreign Application Priority Data

Nov. 9, 2010 (EP) ..................................... 10190510

(51) Int. Cl.
*G04C 5/00* (2006.01)
*G04B 31/00* (2006.01)
(Continued)

(52) U.S. Cl.
CPC .......... *G04C 5/005* (2013.01); *F16C 32/0408* (2013.01); *G04B 17/32* (2013.01);
(Continued)

(58) Field of Classification Search
CPC .. G01C 19/24; F16C 32/0408; F16C 32/0423; F16C 32/0427; G04B 31/00; G04C 3/064; G04C 5/005
(Continued)

(56) References Cited

U.S. PATENT DOCUMENTS 3,496,780 A    2/1970  Clavelloux et al.
5,095,237 A *  3/1992  Bardas ................ F16C 32/0459
                                                    310/181
(Continued)

FOREIGN PATENT DOCUMENTS

DE    1 734 590    11/1956
DE    1 211 460     2/1966
(Continued)

OTHER PUBLICATIONS

European Search Report dated May 3, 2011, in European Patent Application No. 10190510.7, filed Nov. 9, 2010.

*Primary Examiner* — Burton Mullins
(74) *Attorney, Agent, or Firm* — Oblon, McClelland, Maier & Neustadt, L.L.P.

(57) ABSTRACT

A method for orienting a timepiece component including ferromagnetic material, where, on both ends of this component, two magnetic fields each attract it onto a pole piece, with an unbalance in the intensity of these fields around this component, in order to create a differential in the forces thereon and to press one of these ends onto a contact surface of one of the pole pieces, and to hold the other end at a distance from the other pole piece. A magnetic pivot includes such a component with two ends. It includes a guide device with surfaces of two pole pieces each generating a magnetic field attracting one of these ends, the magnetic forces exerted on the two ends being of different intensity, in order to attract only one end into contact with only one of these pole piece surfaces.

29 Claims, 6 Drawing Sheets

(51) Int. Cl.
 *G04B 17/32* (2006.01)
 *F16C 32/04* (2006.01)
 *H02K 7/09* (2006.01)
 *G04C 3/06* (2006.01)

(52) U.S. Cl.
 CPC .............. *G04B 31/00* (2013.01); *G04C 3/064* (2013.01); *H02K 7/09* (2013.01)

(58) Field of Classification Search
 USPC ................................. 310/90.5; 368/168, 287
 See application file for complete search history.

(56) References Cited

U.S. PATENT DOCUMENTS 5,506,459 A * 4/1996 Ritts ........................ A63H 1/00
 310/90.5
9,030,070 B2 * 5/2015 Marechal ............ F16C 32/0408
 310/90.5

FOREIGN PATENT DOCUMENTS

| DE | 1 220 224 | 6/1966 |
| DE | 198 54 063 A1 | 10/2000 |
| FR | 1 115 966 | 5/1956 |
| GB | 739 979 | 11/1955 |

* cited by examiner

Fig. 1  Fig. 2  Fig. 3
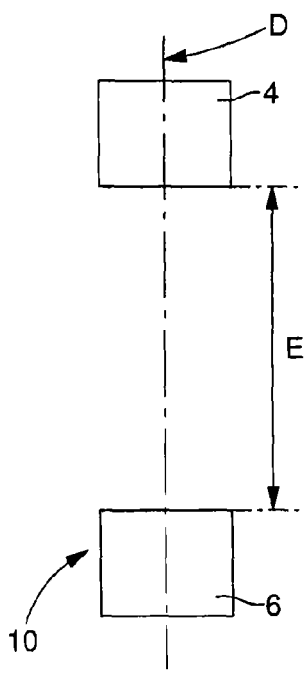
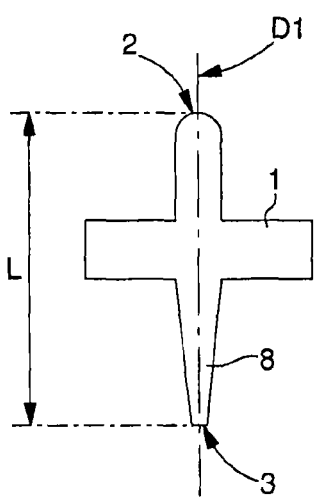
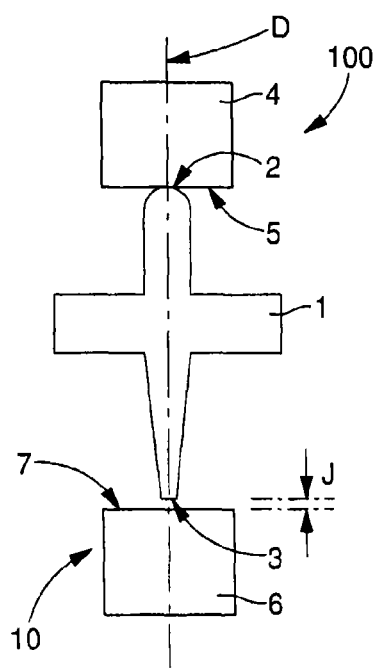
Fig. 4  Fig. 5
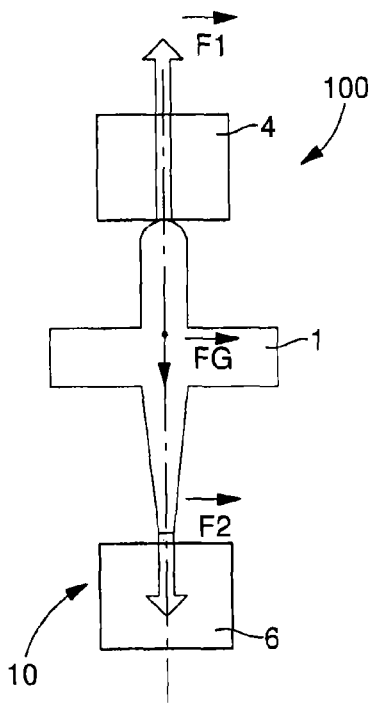
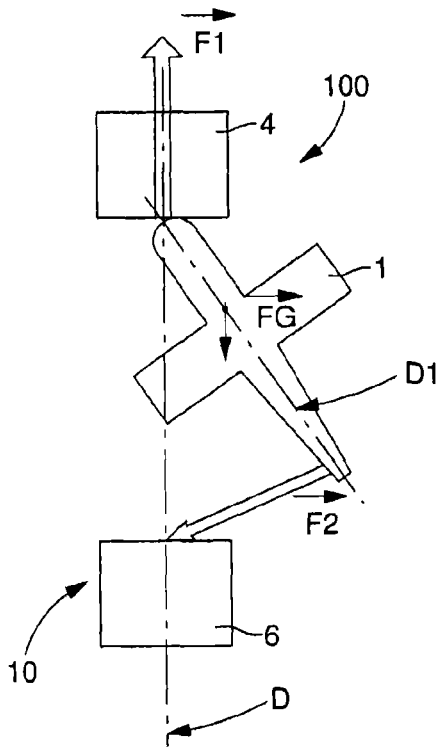

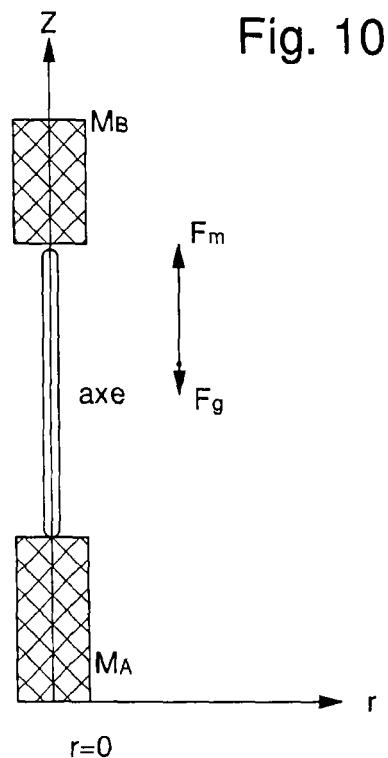
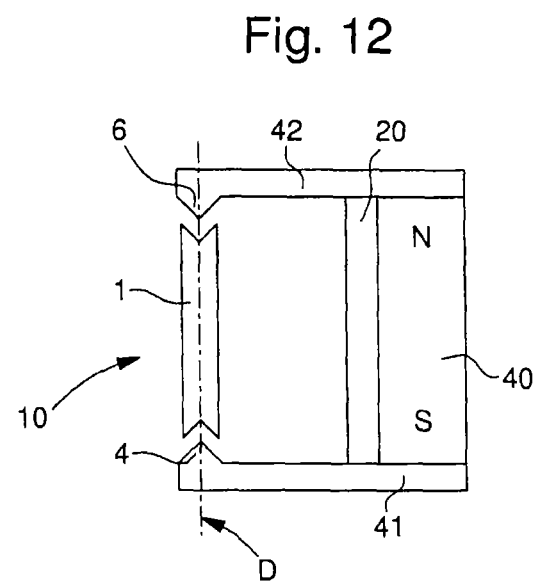
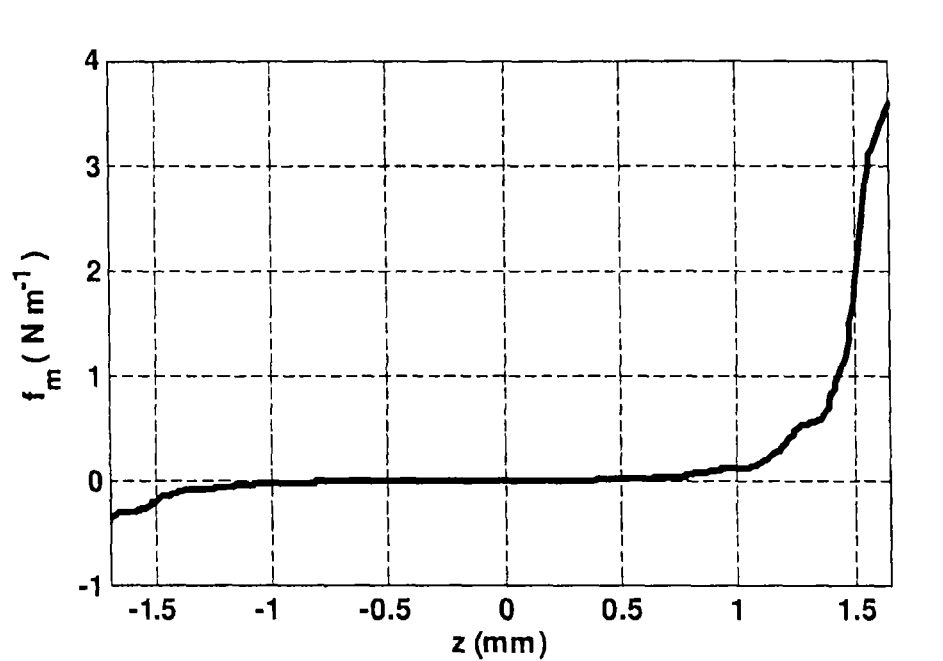

MAGNETIC AND/OR ELECTROSTATIC PIVOT

CROSS-REFERENCE TO RELATED APPLICATIONS

This application is a divisional of U.S. Ser. No. 13/290,544 filed Nov. 7, 2011, now U.S. Pat. No. 9,030,070, the entire content of which is incorporated herein by reference, and claims the benefit of priority under 35 U.S.C. 119 to European Application No. 10190510.7 filed Nov. 9, 2010.

FIELD OF THE INVENTION

The invention concerns a method of orienting a timepiece component to guide the pivoting of said component, which is made of material that is at least partially magnetically permeable or at least partially magnetic, and/or of material that is at least partially conductive or respectively at least partially electrized, wherein said component is pivotally mounted in a chamber between a first end and a second end of said component.

The invention also concerns a device for guiding the pivoting of a timepiece component, which is made of material that is at least partially magnetically permeable or at least partially magnetic, and/or of material that is at least partially conductive or at least partially electrized, at a first end and at a second end.

The invention also concerns a magnetic and/or electrostatic pivot including a timepiece component, made of a material that is at least partially magnetically permeable or at least partially magnetic at a first end and at a second end, or respectively at least partially conductive or at least partially electrized at a first end and at a second end.

The invention also concerns a timepiece movement including at least one device of this type for pivotal guiding, and/or at least one magnetic and/or electrostatic pivot of this type.

The invention further concerns a timepiece including at least one timepiece movement of this type and/or at least one device of this type for pivotal guiding, and/or at least one magnetic and/or electrostatic pivot of this type.

The invention concerns the field of micro-mechanics and in particular horology, to which it is particularly well suited.

BACKGROUND OF THE INVENTION

Micro-mechanics, and in particular horological technique, use conventional solutions for positioning the axis or the arbour of a component, based on mechanical friction.

In the particular application to a pivoting component incorporated in a watch movement, or in an oscillator, a recurring problem lies in the strong dependence of the efficiency and/or quality factor of the component on the position of the watch in which said component is incorporated. In particular, the efficiency and/or quality factor is considerably lower when a watch is in a vertical position. The solutions proposed for overcoming this problem often give preference to a reduction in the efficiency and/or quality factor in the horizontal position rather than an increase in the efficiency and/or quality factor in the vertical position.

The problems to be solved are thus as follows:
Making efficiency and/or the quality factor equal in all positions of the watch.
Increasing efficiency and/or the quality factor in all positions.

DE Patent 12 11 460 in the name of SIEMENS AG is known, which discloses a mobile component, formed by a pin integral with an internal tubular magnet, inserted into an external tubular magnet. The external tubular magnet can move inside a cartouche, coaxial to the two magnets, against a support surface in abutment at one end, and against a spring held by a bush at the other end. This mobile component is also axially guided on a spindle integral with the bush. At each axial end, the mobile component includes a protective sleeve for the fragile ceramic core formed by the internal magnet. The means for guiding pivoting is formed by the cooperation between the two internal and external tubular magnets. However, the holding of the mobile component on the first magnetic pole piece is not equivalent to a support since there is a connection between this mobile component and the internal tubular magnet, via a flange and one of the two sleeves. Consequently, the mobile component of this Patent is not free relative to the first magnetic pole piece formed by the internal magnet, but only relative to the second magnetic pole piece, formed by the external magnet.

DE Patent Application No. 198 54 063 A1 in the name of VLADIMIR JAGMANN discloses a mobile component, made of magnetisable material, placed in an air gap between two magnetic pole pieces generating a magnetic field in a direction perpendicular to the gravitational force of attraction, shorter than the air gap, resting on only one of the magnetic pole pieces, and being semi-levitated in proximity to the other magnetic pole piece. The pivot axis of the mobile component coincides with an axis defined by the poles of the two pole pieces.

DE Patent No. 12 20 224 B in the name of KERN & CO AG discloses, in a similar manner, a mobile component pivoting in the same way, with no friction in a field between two magnets. The two magnets have convex radiating ends made of hard material. The surface of the mobile component abutting on one of these radiating ends is also convex and radiated.

FR Patent No 1 115 966 A in the name of JUNHANS GEB AG discloses a regulator with a rotating balance, and uses static magnetic fields to reduce the effect of the weight of the oscillating member.

DE Patent No 1 734 590 in the name of Friedrich Mauthe GmbH also discloses a magnetic device for lightening the load on a pivot.

GB Patent No 739 979 A in the name of ROULEMENTS A BILLES MINIATURES discloses a magnetic bearing with a vertical axis for a measuring apparatus such as a galvanometer.

U.S. Pat. No. 3,496,780 A in the name of CLAVELOUX NOEL discloses an electrostatic suspension for gyroscope rotors obtained with a plurality of electrodes.

SUMMARY OF THE INVENTION

The invention proposes to overcome the problems of the prior art, by inventing a method for orienting a timepiece component, and more specifically aligning the component on a pivot axis, allowing friction to be drastically reduced compared to ordinary mechanical guide devices, and thereby improving the independence of the operating quality of a timepiece movement with respect to the orientation thereof in space.

To achieve this, the invention implements a device for guiding the pivoting of the component, so as to form a magnetic pivot for timepiece components providing efficiency and/or a quality factory that is independent of position.

The invention therefore concerns a method for orienting a timepiece component to guide the pivoting of said component, which is made of material that is at least partially magnetically permeable or respectively at least partially magnetic, and/or of material that is at least partially conductive or respectively at least partially electrized, wherein said component is pivotally mounted in a chamber between a first end and a second end of said component, characterized in that, on both sides of said first and second ends, two magnetic or respectively electrostatic fields are created, each tending to attract said component onto a pole piece, and an unbalance is created between said magnetic or respectively electrostatic fields around said component, so as to create a differential in the forces thereon in order to press one of said ends of said component onto a contact surface of one of said pole pieces, and to hold the other of said ends at a distance from a contact surface of the other pole piece, said magnetic or respectively electrostatic fields being of different intensity at said first end and said second end, and further characterized in that said first pole piece and said second pole piece are distinct from said component, and are each located at the periphery of or in proximity to said chamber, and are each made of material that is at least partially magnetic or respectively magnetically permeable, and/or of material that is at least partially electrized or respectively at least partially conductive, and further characterized in that said component is freely mounted in said chamber between said pole pieces so as to rest on a support surface in proximity to only one of said pole pieces.

The invention therefore also concerns a device for guiding the pivoting of a timepiece component made of material that is at least partially magnetically permeable or respectively at least partially magnetic, and/or material that is at least partially conductive or respectively at least partially electrized, wherein said component is pivotally mounted in a chamber between a first end and a second end of said component, characterized in that it includes, at a greater air-gap distance, by the value of a determined operational play, than the distance of centres between said first end and said second end, a first surface of a first pole piece and a second surface of a second pole piece, wherein said poles pieces are arranged either each to be attracted by a magnetic or respectively electrostatic field transmitted by one of said first or second ends of said component, or each to generate a magnetic or respectively electrostatic field attracting one of said first or second ends of said component, such that the magnetic or respectively electrostatic attraction forces being exerted on said component at the two ends thereof are of different intensity, so as to attract said component via one of the said two ends thereof, in direct or indirect contact onto only one of said surfaces of said pole pieces, wherein said magnetic or respectively electrostatic fields are of different intensity at said first end and said second end.

The invention also concerns a magnetic or respectively electrostatic pivot, including a timepiece component made of material that is at least partially magnetically permeable or respectively at least partially magnetic, and/or of material that is at least partially conductive or at least partially electrized, wherein said component is pivotally mounted in a chamber between a first end and a second end of said component, characterized in that it includes a device for guiding the pivoting of said timepiece component including, at a greater air-gap distance, by the value of a determined operational play, than the distance of centres between said first end and said second end, a first surface of a first pole piece and a second surface of a second pole piece, wherein said poles pieces are arranged either each to be attracted by a magnetic or respectively electrostatic field transmitted by one of said first or second ends of said component, or each to generate a magnetic or respectively electrostatic field attracting one of said first or second ends of said component, such that the magnetic or respectively electrostatic attraction forces being exerted on said component at the two ends thereof are of different intensity, so as to attract said component via one of the said two ends thereof, in direct or indirect contact onto only one of said surfaces of said pole pieces, said magnetic or respectively electrostatic fields being of different intensity at said first end and said second end.

The invention also concerns a timepiece movement including at least one device of this type for pivotal guiding, and/or at least one magnetic and/or electrostatic pivot of this type.

The invention further concerns a timepiece including at least one timepiece movement of this type and/or at least one device for pivotal guiding of this type, and/or at least one magnetic and/or electrostatic pivot of this type.

BRIEF DESCRIPTION OF THE DRAWINGS

Other features and advantages of the invention will appear more clearly upon reading the following detailed description, with reference to the annexed drawings, in which:

FIG. 1 shows a schematic, partial elevation of a device for guiding a component according to the invention.

FIG. 2 shows, in a similar manner to FIG. 1, a component for incorporation into a magnetic pivot according to the invention.

FIG. 3 shows, in a similar manner to FIG. 1, a magnetic pivot according to the invention including the device of FIG. 1, and the component of FIG. 2 in a position of stable cooperation.

FIG. 4 shows, in a similar manner to FIG. 1, a magnetic pivot according to the invention, revealing the system of forces acting on the component.

FIG. 5 shows, in a similar manner to FIG. 4, the system of forces acting on the component shown in a position that has been made unstable.

FIG. 10 shows a schematic view of the ratio of forces acting on a component.

FIG. 11 shows a diagram of the growth in the resulting magnetic force density as a function of the abscissa along the longitudinal axis of FIG. 10.

FIG. 12 shows a schematic elevation of a variant of the component guide device according to the invention.

DETAILED DESCRIPTION OF PREFERRED EMBODIMENTS

Figure 6:
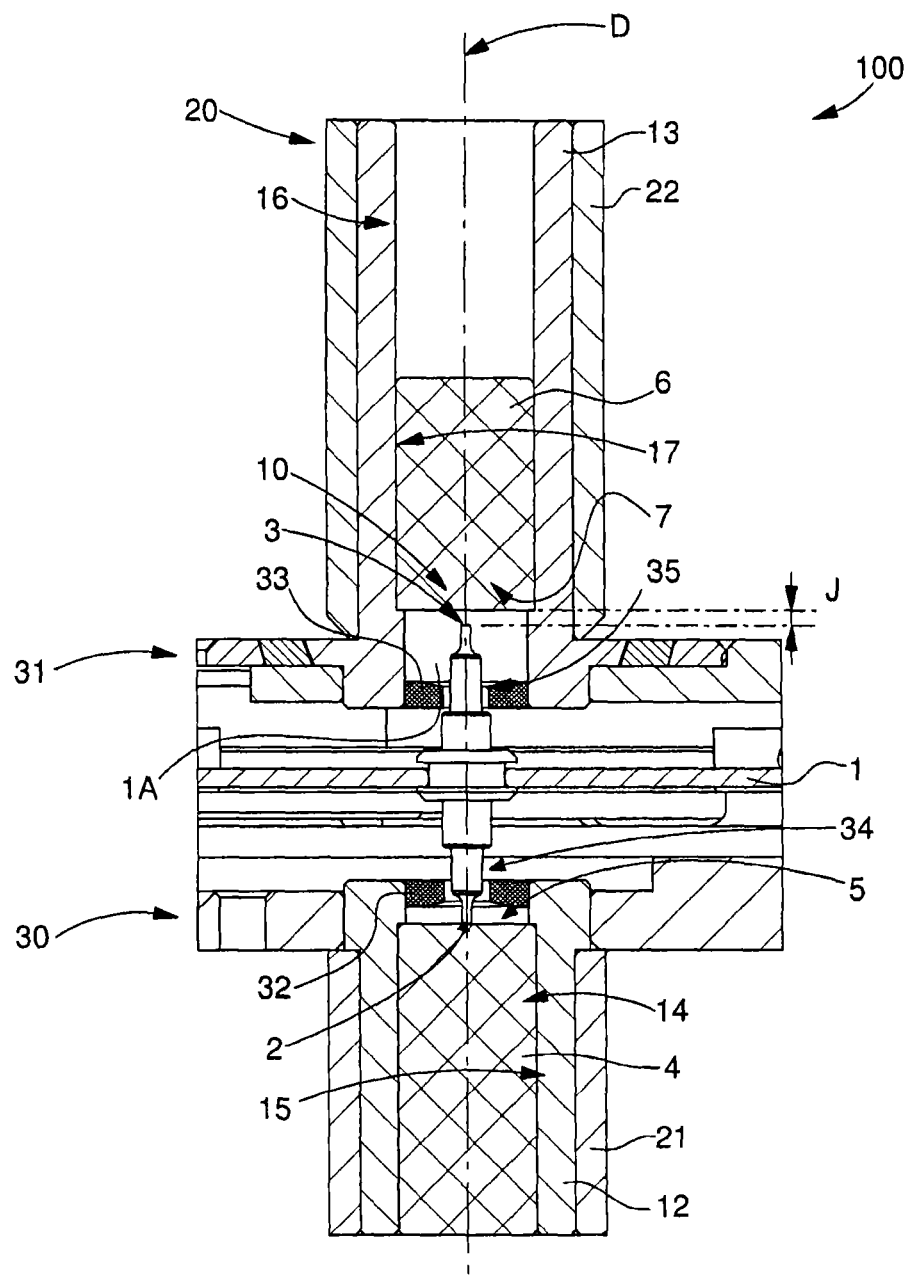
FIG. 6 shows, in longitudinal cross-section along the pivot axis thereof, a magnetic pivot according to the invention including a device for guiding a component according to the invention, in a first embodiment.

The invention develops a particular method for orienting a timepiece component 1 to guide the pivoting thereof, and, more specifically, for aligning said component on a pivot axis D.

The object of the invention is to provide an alternative to conventional pivots, and to drastically reduce friction compared to ordinary mechanical guide devices, and thereby improve the independence of the operating quality of a timepiece movement relative to the orientation thereof in space.

In order to implement this method, the invention further concerns a device for guiding the pivoting of the component, so as to form a magnetic and/or electrostatic pivot for timepiece components providing efficiency and/or a quality factor that is independent of position.

Owing to certain particular features, which will be set out hereinafter, notably the preferred use of highly intense magnetic and/or electrostatic forces relative to the force of gravity, the invention finds more particular application in the field of micro-mechanics and more particularly the field of horology, for which it was developed and has been the subject of operating prototypes. The low mass of horological components means very low weight, and, in a manner compatible with the dimensions of a watch or suchlike, it is possible to generate magnetic and/or electrostatic fields capable of producing on said component forces and/or attraction torques that are at least ten times greater than the attraction force or torque of gravity. Thus the invention is described here for this preferred horological application, and can be immediately used in the current state of the art of magnets and electrets, and can be implemented in the necessary dimensions with the required magnetic or electrostatic field intensities, without any particular development.

The invention proposes to improve the pivoting conditions of a component, by reducing friction compared to the prior art, and by permanently aligning the principle axis of inertia thereof, hereinafter called the "longitudinal axis" for the sake of simplicity, on a theoretical pivot axis. Naturally, the invention is also applicable to components which are unbalanced or pivot about a different axis from the main axis of inertia, but the invention provides the greatest advantages in the preferred case where the main axis of inertia of the component coincides with the pivot axis.

In a non-limiting manner, the component may therefore be a balance, a sprung balance assembly, an escape wheel, pallets, a gear wheel, a ratchet, a click, a lever, a barrel, an automatic winding rotor, a date or moon phase disc, a hammer, a heart-piece, a column wheel, or any other component that is usually pivotally moveable.

The invention forms a system of axis-pivots for a component using magnetic and/or electrostatic forces.

In the explanation set out hereinafter, "magnetically permeable" materials are materials having a relative permeability comprised between 100 and 10000 such as steels, which have a relative permeability close to 100 for balance staffs, for example, or close to 4000 for the steels commonly used in electric circuits, or other alloys whose relative permeability reaches values of 8000 to 10000.

"Magnetic materials", for example in the case of pole pieces, are materials able to be magnetised so as to have a remanent field comprised between 0.1 and 1.5 Tesla, such as for example "Neodymium Iron Boron" having a magnetic energy density Em close to 512 kJ/m$^3$ and giving a remanent field of 0.5 to 1.3 Tesla. A lower level of remanent field, towards the bottom part of the range, may be used in the event of the combination, in a magnetising pair, of a magnetic material of this type with a magnetically permeable antagonistic component with high permeability, closer to 10000 within the range of 100 to 10000.

"Paramagnetic" materials are materials with a relative permeability comprised between 1.0001 and 100, for example for connecting pieces inserted between a magnetic material and a magnetically permeable antagonistic component or between two magnetic materials, for example a connecting piece between a component and a magnetic pole piece.

"Diamagnetic" materials are materials with a relative magnetic permeability of less than 1.

Finally, "soft magnetic" materials, as opposed to "amagnetic" materials, particularly for shields, are materials having high magnetic permeability but high saturation, since they are not required to be permanently magnetic: they must conduct the field as well as possible, so as to reduce the field external thereto. These components can then also protect a magnetic system from external fields. These materials are preferably chosen to have a relative magnetic permeability of between 50 and 200 and with a saturation field of more than 500 Nm.

"Amagnetic" materials are defined as materials with a relative magnetic permeability very slightly greater than 1, and less than 1.0001, typically like silicon, diamond, palladium and similar materials. These materials may generally be obtained via MEMS technology or the LIGA method.

In the following description, "conductive" materials are materials whose resistivity at ambient temperature (T=20° C.) is less than 1 μΩm): for example, silver, gold and aluminium are excellent conductors. In the following description, "insulating" materials are materials whose resistivity at ambient temperature is higher than 10,000 MΩm) and whose dielectric rigidity is greater than 10 kV/mm: for example vitreous or plastic materials are generally good insulators.

In order to be able to guarantee a high level of efficiency and quality factor in all positions of a timepiece, the effects of the force of gravitational attraction must be minimised. For typical timepiece dimensions and using commercially available micro-magnets, it is possible to generate magnetic and/or electrostatic forces greater than the force of gravity and than the torque acting on the component during operation. A system controlled by magnetic and/or electrostatic forces is much less sensitive to gravity and thus to changes in the position of the watch, than conventional mechanical systems.

The invention is more particularly described with application to magnetic forces. It is applicable in the same manner to the application of electrostatic forces, or even to a combination or mix of magnetic and electrostatic forces. In particular, component 1 pivoting on an axis D extends, in the direction of this axis D, between a first end 2 and a second end 3 thereof. This first end 2 and second end 3 may be subject to different treatment, for example, first end 2 may be subjected to an array of magnetic forces, and second end 3 may be subject to an array of electrostatic forces or vice versa. The same end may also be subject, cumulatively, to an array of magnetic forces and to an array of electrostatic forces.

A first construction, seen in FIG. 10, consists in introducing pole pieces, preferably formed by one or several micro-magnets, or respectively by electrized masses, into the pivoting movements of the component, adjusted to magnetise, or respectively electrize, an arbour, for example made of soft magnetic or respectively conductive material, comprised in the component, and thus to generate a magnetic or respectively electrostatic attraction force, between bearings and the arbour of the component.

The preferred horological application described here encourages the use, in the version where forces of magnetic origin are used, of permanent magnets to form the pole pieces used by the invention, but it is clear that for other applications, notably static applications, it is also possible to employ electro-magnets. The use of the term "magnet" in the following description generally indicates a magnetised pole piece.

On both sides of said first end 2 and second end 3 of component 1, there are, on the one hand, means for guiding the pivoting of, or preferably according to the invention, means for attracting first end 2, held resting on a first pole piece 4 distinct from component 1 and, on the other hand, in proximity to a second pole piece 6, distinct from component 1, means for guiding the pivoting of the second end 3, or preferably means for attracting said second end 3 to the second pole piece 6.

Component 1 is, at least in proximity to the first end 2 and the second end 3 thereof, preferably made of a magnetically permeable and/or conductive material. In a particular embodiment of the invention, this material is also magnetised and/or electrized.

Figure 7:
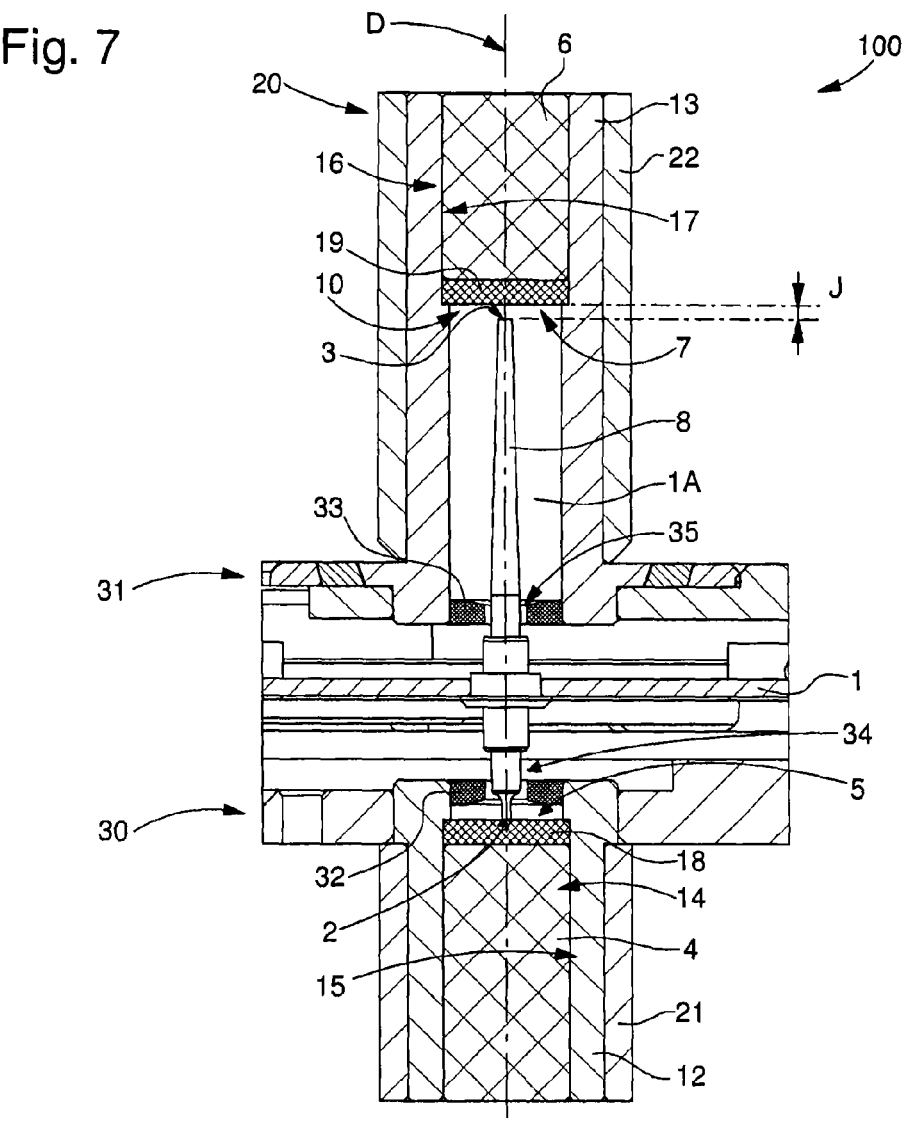
FIG. 7 shows a similar, schematic view to FIG. 6 of a magnetic pivot according to another embodiment.
Figure 9:
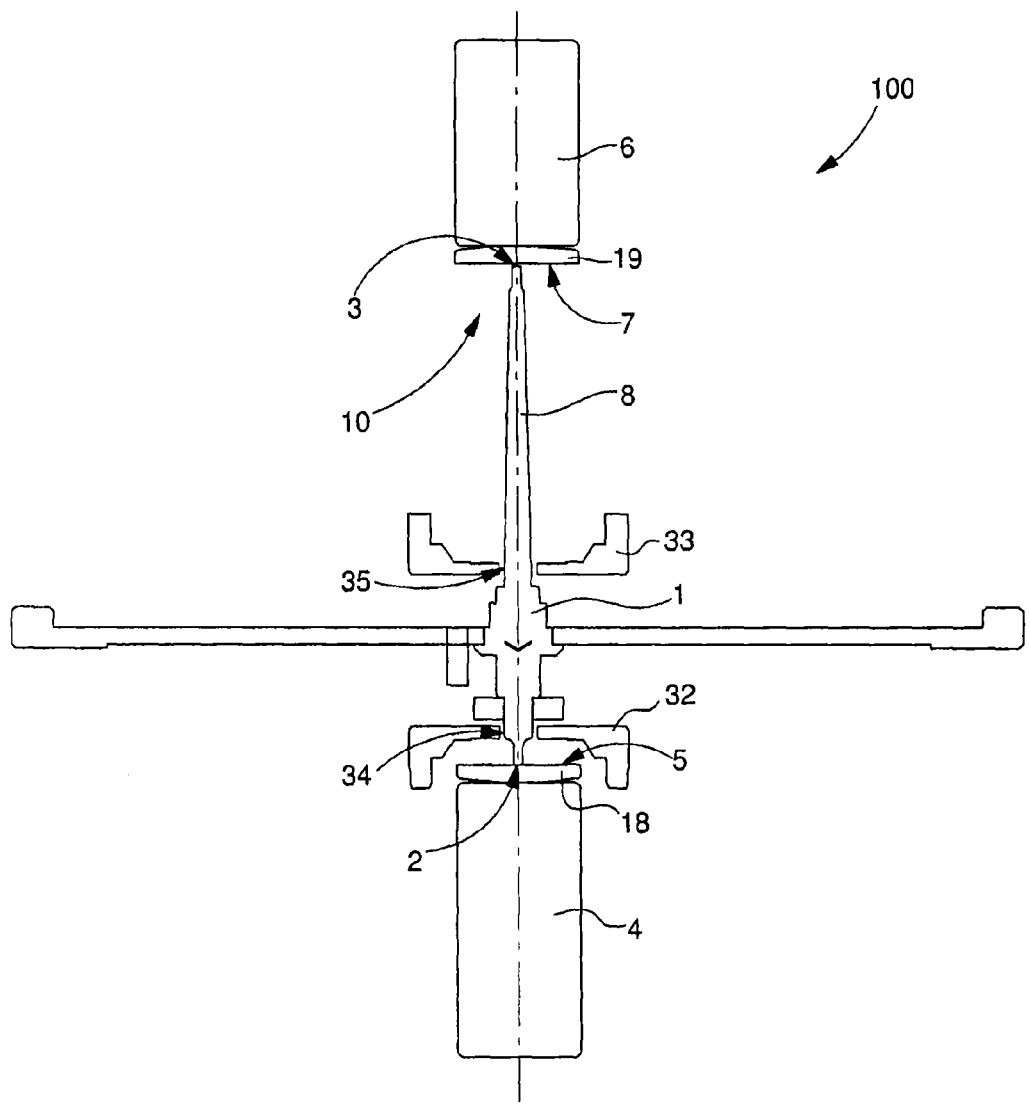
FIG. 9 shows a component formed by a balance, inserted in a component guide device according to the invention.
Figure 13:
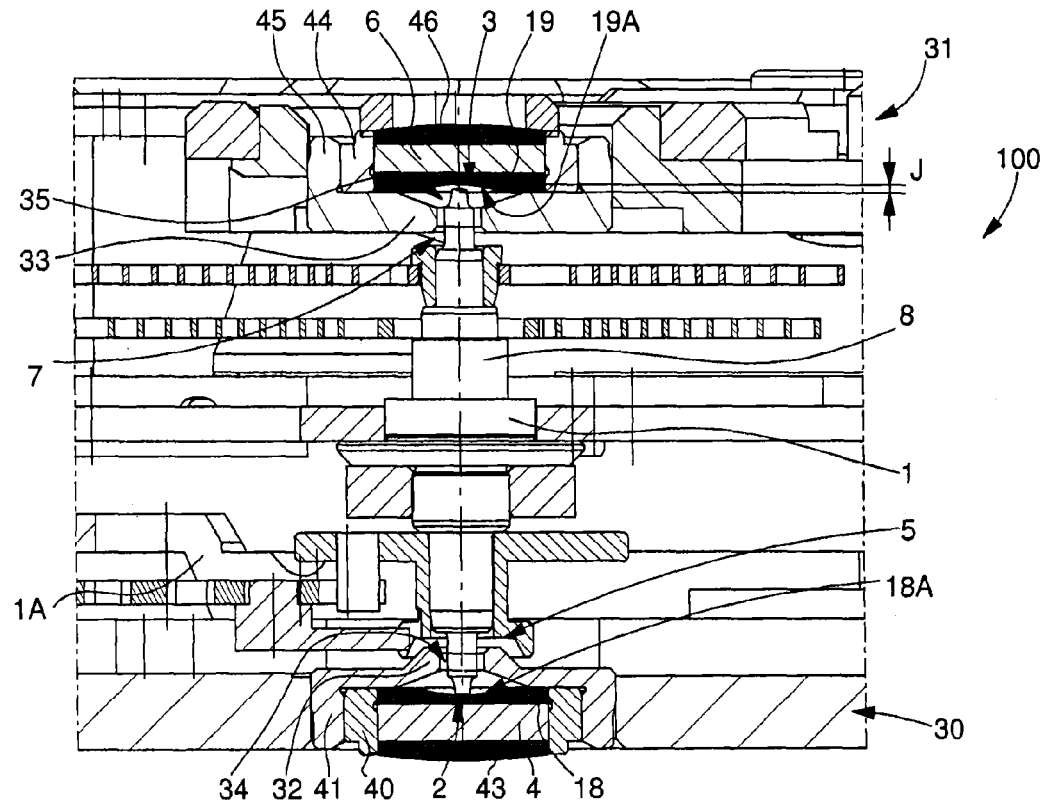
FIG. 13 shows a schematic, longitudinal cross-section along a pivot axis of an alternative embodiment of a device according to the invention, provided with a damping device.

Component 1 can move in a chamber 1A. A "pole piece" means a mass, which, at least in proximity to chamber 1A is made of a magnetically permeable and/or conductive material, or, in a particular, preferred embodiment of the invention, in a magnetised and/or electrized material. The pole piece 4 or 6 does not form part of component 1, and is thus located at the periphery or in proximity to chamber 1A:

In a first embodiment, for example as seen in FIGS. 7, 9 and 13, the pole piece is separated from chamber 1A by a connecting piece which includes a support or stop surface for component 1. In FIG. 7, a first pole piece 4 is thus separated from component 1 by a connecting piece 18, which includes a first support surface 5 of this type, and a second pole piece 6 is separated from component 1 by a connecting piece 19, which includes a second stop surface 7 of this type. In this variant, although they have no direct contact with component 1, the pole pieces interact therewith, depending upon the particular case, via magnetic and/or electrostatic attraction or repulsion: either one axial end of component 1 in axial direction D is magnetised or electrized, and cooperates with the closest pole piece, which is magnetically permeable or conductive under the action of a magnetic or electrostatic force, or conversely, one axial end of component 1 in axial direction D is magnetically permeable or conductive, and cooperates with the closest pole piece, which is magnetised or electrized.

In another embodiment, seen in FIG. 6, this pole piece may include a surface forming one of the lateral surfaces of chamber 1A, which the first end 2 or second end 3 of component 1 is capable of coming in proximity to or in contact with. Preferably, when component 1 is a mobile component pivoting about a pivot axis D, this surface of the pole piece is located in the continuation of said axis D. The magnetic and/or electrostatic interaction occurs as in the preceding case, but without the connecting pieces: component 1 is then in direct contact with one of the pole pieces.

Other embodiments concerns different variants at each end of component 1: direct contact on one side, indirection repulsion or attraction force on the other.

The invention is more specifically presented here in the preferred case where component 1 is subject to an array of attraction forces. Naturally, it is similarly possible to envisage a differential array of repulsion forces, holding component 1 on axis D via pole pieces distributed annularly around this axis. However, although this variant offers the advantage of allowing complete levitation of component 1, it has the drawback of occupying significant annular volume annularly around component 1. Moreover, complete levitation no longer allows the perfect axial positioning of component 1 on axis D provided by the invention, because of the support of component 1 at one of the ends thereof.

The first pole piece 4 and the second pole piece 6 are distinct from component 1 and are each located at the periphery of or in proximity to chamber 1A and are each made of at least partially magnetic or respectively at least partially magnetically permeable material, and/or at least partially electrized or respectively at least partially conductive material. Component 1 is freely mounted in chamber 1A between pole pieces 4 and 6 so as to rest on a support surface in proximity to only one of these pole pieces 4, 6.

FIG. 10 is a two-dimensional, axially symmetrical, schematic diagram of an embodiment of component 1, for example a balance, in a version where the attraction forces are of magnetic origin: the longitudinal axis defined by a first end 2 and a second end 3 of the component made of magnetisable or magnetic material, is located between two magnetic pole pieces, particularly permanent magnets $M_A$ and $M_B$, the magnetic polarisation of which is directed in a direction z which is the theoretical pivot axis of the component, and on which the longitudinal axis of the component has to be aligned. The "arbour of the component" hereafter means a shaft-like part of component 1 which extends between first end 2 and second end 3 thereof. The arbour of component 1 may be supported either directly on this magnet or magnets, or by two jewels inserted between the magnets and the arbour of the component, or by surface treatment of the magnets. As seen in FIG. 7 of a particular embodiment, the arbour of component 1 may be made on a connecting piece 18 fitted to the first pole piece 4. The second pole piece 6 may also include a connecting piece 19 of this type. These connecting pieces must allow the magnetic field to pass. Their role is essentially tribological, as regards the connecting piece which forms a support surface, and also to protect the pole pieces in the event of a shock. FIGS. 3, 4 and 6 illustrate the direct support of component 1 on a first pole piece 4 and the possibility of intermittent support, which is also direct, for example during assembly or in the event of a shock, on a second pole piece 6. The size and/or magnetic energy of the magnets and the length of the arbour of the component are optimised to maximise the attraction force $F_m$ between the arbour and one of the two magnets $M_B$.

According to the invention, the attraction force $F_m$ is much larger than the force of gravity $F_g$, preferably in a ratio of at least 10 to 1, and the arbour rests in a stable manner on only one of the two magnets in all the positions of the timepiece or of the watch. The two forces applied to the centre of gravity of the component are shown in a diagram in the case where $F_g$ is opposite to $F_m$.

A magnetic return torque acts on the arbour when the arbour deviates from direction z: the geometry is optimised so that the magnetic return torque is greater than the torque produced by the force of gravity and than the torque which the component is allowed for stabilising the orientation of the arbour in direction z.

The magnetic force which acts on the magnetised arbour is proportional to the magnetisation $M_{axe}$ (r, z) thereof and to the gradient of the magnetic field H produced by the two magnets:

$$\vec{F}_m = \mu_0 \int_{V_{axe}} d\vec{r} \vec{M}_{axe} \cdot \vec{\nabla} H$$

where integration occurs over the volume of the arbour $V_{axe}$.

This relation optimises the size and/or magnetic energy of the magnets and the geometry of the arbour of the component, in order to maximise the attraction force between the arbour and one of the two magnets $M_B$ in the case of FIG. 10. Consequently, the arbour only rests on one of the two magnets in all positions.

Since the attraction force is greater than the force of gravity and than the maximum force applied to the component, this configuration is stable.

The invention advantageously improves the efficiency of conventional anti-shock solutions, which can thus advantageously be integrated in this invention, because it guarantees that the arbour is returned to the correct position of equilibrium after a shock, which conventional mechanical pivot devices cannot guarantee. The function of the upper magnet is to stabilise the orientation of the arbour. The magnetic torque acting on the arbour is given by:

$$\vec{C}_m = \mu_0 \int d\vec{r} \vec{M}_{axe} \times \vec{H}$$

The magnetic torque is only zero if the arbour is oriented like the field lines, and therefore in direction z. If the orientation of the arbour is disturbed and strays from direction z, the return torque $C_m$ re-centres the arbour in the position of equilibrium.

FIG. 11 illustrates the magnetic force density on the arbour of the component, in this case a watch balance, for real parameters. The resulting magnetic force is $F_m$=10 mN, directed towards magnet $M_B$, and therefore a larger order of magnitude than that of the force of gravity, creating a greater torque than the maximum torque applied to the component by the environment.

The invention has the advantage of largely confining the magnetic field inside the component arbour, and the field lines are practically parallel to direction z. The resulting magnetic force density for real parameters is shown in FIG. 11. Since the positive component, which corresponds to a force in the direction of $M_B$, is greater, the net force which acts on the balance is directed towards $M_B$.

Since the force acting on the arbour only slightly depends upon the position of the arbour on the support surface, with the field being substantially homogeneous in the centre of the surface of the pole pieces (notably magnets), the arbour is free to rotate around z without any additional friction. Therefore the dissipation of energy generated by the oscillation of the component is greatly reduced, in the same way as with mechanical friction: the efficiency and/or quality factor can be increased in all positions.

In an alternative configuration, the arbour of the component may itself be a permanent magnet, either surrounded by pole pieces made of magnetisable material, or themselves magnetised, which then maximises the magnetic forces and torques present, and further minimises the influence of gravity.

In an alternative configuration, the arbour and/or board of the component may be formed by a diamagnetic material, for example pyrolytic graphite, and the pivot can be formed by several alternating magnets, to allow the diamagnetic levitation and positioning of the component.

Numerous advantages result from the features of the invention:
- the efficiency and/or quality factor of the component is identical in all positions of the timepiece, with variations of less than 5%;
- the efficiency and/or quality factor is increased in all positions compared to with the use of conventional pivots;
- in the case where the component oscillates, in particular a balance, the oscillation amplitude thereof is increased and identical in all positions.
- friction and dissipation of energy are minimised as are torque variations;
- the number of components is limited compared to other solutions;
- the invention is anti-shock by its very nature;
- the system can be integrated in other magnetic elements.
- the invention is easy to integrate in any type of timepiece or watch, in particular a mechanical timepiece or watch, whether it is simple or with complications, or in any portable scientific apparatus or similar device.

A variant of the invention with non-aligned magnets may be of interest in certain cases, in particular for components for which the effect of the disturbance torque is negligible and for which a non-aligned configuration is simpler to achieve, because of the shape or position of the component.

For a generic component, it must also be considered that the invention further advantageously allows the use of curved arbours: in such case, the two magnetic pole pieces (notably magnets) must have a different direction.

When the field lines of the two magnetic pole pieces (notably magnets) are not aligned, the system searches for a sufficiently stable position of equilibrium. If the two directions are not too different, the longitudinal axis of the component may remain within a dynamic regime indefinitely, passing from an unstable position to another unstable position. However, any misalignment has the effect of reducing the magnetic force applied to the component and, especially the return torque. Consequently, stability is therefore lower than in the preferred case of aligned field lines. When the component forms part of an oscillator, misalignment should be avoided, since it would introduce a radial magnetic torque having a disruptive effect on operation.

It is possible to envisage different variants of a magnetic pivot according to the invention, depending upon the composition and magnetic properties of the component: the fact that the arbour is made of homogeneous material means that the field lines can easily be closed. Slight non-homogeneousness in the longitudinal direction, associated with variations in density, section or concentrations of the alloy, may be used to deliberately increase the asymmetry of the force and thus increase the attraction force on one of the two sides. The material of the component, at least at the first and second ends, is preferably ferromagnetic, since a paramagnetic material would produce a force that is too weak.

It is also possible to insert a amagnetic area, i.e. with very low magnetic permeability, between magnetic areas which are located at the first and second ends, if said ends are permanently magnetised. This arrangement provides a sufficiently large force and torque.

FIGS. 1 to 14 illustrate the embodiment of the invention.

The invention concerns a method for orienting a timepiece component 1 to guide the pivoting of said component, which is made of material that is at least partially magnetically permeable or respectively at least partially magnetic, and/or of material that is at least partially conductive or respectively at least partially electrized, wherein said component is pivotally mounted in a chamber 1A between a first end 2 and a second end 3 of said component 1.

According to the invention, on both sides of said first end 2 and second end 3 two magnetic or respectively electrostatic fields are created, each tending to attract component 1 onto a pole piece 4, 6 and an unbalance is created between the magnetic or respectively electrostatic fields, around component 1 so as to create a differential in the forces thereon to press one of the two ends 2, 3 onto a contact surface 5, 7 of one of pole pieces 4, 6 and to hold the other of said ends 3, 2 at a distance from a contact surface 7, 5, comprised in the other pole piece 6, 4. This unbalance between the magnetic or respectively electrostatic fields is created and exists around the air gap formed by the space comprised between these contact surfaces 5 and 7 which delimits chamber 1A locally.

These magnetic or respectively electrostatic fields are asymmetrical in relation to each other and of different intensity from each other.

The invention can be achieved, either by creating magnetic or respectively electrostatic fields on pole pieces 4 and 6, or on component 1 itself, or both on pole pieces 4, 6 and component 1.

When the magnetic or respectively electrostatic fields are created on pole pieces 4 and 6, the unbalance between the magnetic or electrostatic fields exists, according to the invention, regardless of whether or not component 1 is present in the air gap: the fields are asymmetrical in relation to each other, and of different intensity from each other, and according to the invention, the unbalance creating a differential in the forces on the component does not depend upon the position of said component in the air gap, but depends only on the asymmetrical fields created on pole pieces 4 and 6.

When the magnetic or respectively electrostatic fields are created on component 1 itself, they also are of different intensity at ends 2 and 3 of component 1.

When the magnetic or respectively electrostatic fields are created both on pole pieces 4 and 6 and component 1, they are sized such that the resultant thereof is asymmetrical, both on pole pieces 4 and 6 and ends 2 and 3 of component 1.

In a first preferred variant, on both sides of first end 2 and second end 3, two magnetic fields are created in substantially the same direction and sense. This first variant applies in particular for a component whose arbour is conductive and magnetisable from the first end 2 thereof to the second end 3 thereof, and this is how the magnetic field density is best concentrated around pivot axis D.

In another variant, on either side of first end 2 and second end 3 two magnetic fields are created in substantially the same direction and in the opposite sense. This other variant applies when there is electrical and/or magnetic discontinuity between the first end 2 and the second end 3, for example if a component with very low magnetic permeability includes only two magnetically permeable or magnetic half arbours at the ends 2, 3 thereof. Naturally, the configuration of fields of the first variant is also applicable to this case. Another variant that can be achieved is where the component 1 is in a single piece, and where discontinuity is achieved by a particular fabrication method, for example by surface treatment.

In a particular and preferred embodiment in the case where the component is a balance or an oscillator member, the two magnetic fields having the same direction are created on either side of the first end 2 and second end 3.

In the variant illustrated by the Figures, according to the invention, the timepiece component 1 is oriented on a pivot axis D defined by the arrangement of the two magnetic fields and their respective pole pieces 4, 6. On either side of the first end 2 and second end 3 on first pole piece 4 and second pole piece 6, a first magnetic field and a second magnetic field having opposite senses are created, each having revolution symmetry around pivot axis D and tending to attract component 1 towards the pole piece 4, 6 thereof. The density of the first magnetic field in proximity to first end 2 is selected to be greater than that of the second magnetic field in proximity to second end 3, so as to attract the first end 2 into contact with the first pole piece 4. The air gap E between pole pieces 4, 6 is defined to be greater than the value of a determined operating play J, at the distance of centres L between first end 2 and second end 3.

The invention also concerns a device 10 for guiding the pivoting of a timepiece component 1, suitable, in particular, for implementing this orientation method for guiding the pivoting of said component. This component 1 must be made of material that is at least partially magnetically permeable or respectively at least partially magnetic, and/or of material that is at least partially conductive or respectively at least partially electrized, wherein said component is pivotally mounted in a chamber 1A between a first end 2 and a second end 3 of said component 1.

The guide device 10 includes, on both sides of the first and second ends 2 and 3, on the one hand, means for attracting the first end 2 for holding said first end 2 resting on a first pole piece 4 and, on the other hand, in proximity to a second pole piece 6, means for attracting said second end 3 to said second pole piece 6.

According to the invention, this guide device 10 then includes, on both sides of first end 2 and second end 3, at an air-gap distance E which is greater, by the value of a determined operational play J, than the distance of centres L between first end 2 and second end 3, a first surface of a first pole piece 4 and a second surface of a second pole piece 6.

These pole pieces 4 and 6, distinct from component 1, are arranged either each to be attracted by a magnetic or respectively electrostatic field, transmitted by one or first end 2 or second end 3 of component 1, or, in a preferred manner, each to generate a magnetic or respectively electrostatic field attracting one of first end 2 or second end 3 of component 1.

These magnetic or respectively electrostatic fields are of different intensity from each other, at first end 2 and second end 3, such that the magnetic or respectively electrostatic forces being exerted on component 1 at the two ends 2 and 3 thereof are of different intensity, so as to attract component 1 via only one of the two ends 2 and 3 thereof, into direct or indirect contact on only one of the surfaces of pole pieces 4 and 6.

In a particular variant, the first pole piece 4 and second pole piece 6 are each moveable in a chamber between two stop members.

In a particular variant, the means for attracting first end 2 on the one hand, and the means for attracting second end 3 on the other hand, can move along an axial direction D between stop members.

According to the invention, device 10 includes, at an air-gap distance E which is greater, by the value of a determined operational play J, than the distance of centres L between first end 2 and second end 3, a first surface 5 of a first pole piece 4 and a second surface 7 of a second pole piece 6.

These magnetic pole pieces 4, 6 are arranged either each to be attracted by a magnetic or respectively electrostatic field transmitted by one of first end 2 or second end 3 of component 1, or each to generate a magnetic or respectively electrostatic field attracting one of first end 2 and second end 3 of component 1, such that the magnetic or respectively electrostatic attraction forces being exerted on component 1 at the two ends 2, 3 thereof are of different intensity, so as to attract component 1 via one of the two ends 2, 3 thereof into direct or indirect contact on only one of surfaces 5, 7 of pole pieces 4, 6.

The magnetic or respectively electrostatic fields which are being exerted in proximity to first end 2 and second end 3 are of different intensity from each other and are asymmetrical.

According to the invention, the first pole piece 4 and second pole piece 6 are each made of magnetic or magnetically permeable, or respectively electrized or conductive material and are magnetic or respectively electrized, if component 1 is not. First pole piece 4 and second pole piece 6 together define a pivot axis D, on which a longitudinal axis D1 of component 1 is aligned, joining the first end 2 and second end 3 thereof, when component 1 is inserted between first pole piece 4 and second pole piece 6.

According to the invention, the first pole piece 4, respectively the first end 2 generates, in proximity to first surface 5, a first magnetic, or respectively electrostatic field, along pivot axis D, which tends to move first pole piece 4 closer to first end 2, and is of higher density than the density of a second magnetic or respectively electrostatic field, along pivot axis D, generated in proximity to second surface 7 by second pole piece 6, or respectively second end 3. The second magnetic or respectively electrostatic field tends to move the second pole piece 6 closer to second end 3, such that the first end 2 is held in contact with first surface 5 and such that longitudinal axis D1 of component 1 coincides with pivot axis D, and the second end 3 then remains at a distance from the second surface 7.

Advantageously the air-gap distance E between first surface 5 and second surface 7 is dimensioned to ensure the determined operational play J over the entire range of temperatures of use of guide device 10 and of component 1. This play is strictly positive, which excludes any clamping or friction fit. Preferably, the determined operational play J is greater than or equal to 0.020 mm.

Preferably, the magnetic permeability of the material of component 1 is selected, and the magnetisation, as appropriate, of first pole piece 4 and second pole piece 6 on the one hand, and/or component 1 on the other hand, is fixed such that the first magnetic field and the second magnetic field exert on component 1 attraction forces that are at least 30% greater than the gravitational force of attraction on component 1, and preferably five to ten times greater than the gravitational force of attraction on component 1, in order to obtain the best behaviour when the timepiece is moving.

Likewise, the magnetic permeability of the material of component 1 is selected and the magnetisation, as appropriate, of first magnetic pole piece 4 and second magnetic pole piece 6, on the one hand, and/or of component 1 on the other hand, is fixed preferably such that the first magnetic field and the second magnetic field exert attraction torques on component 1 that are more than ten times greater than the gravitational torque of attraction on component 1, in all positions thereof.

Preferably, the magnetic field density in proximity to the first surface 5 and second surface 7 is greater than or equal to 100000 A/m.

Device 10 advantageously includes shielding means 20 made of soft magnetic materials, which are arranged to prevent the action of any magnetic field with a radial component relative to pivot axis D, in proximity to first and second contact surfaces 5 and 7.

Figure 8:
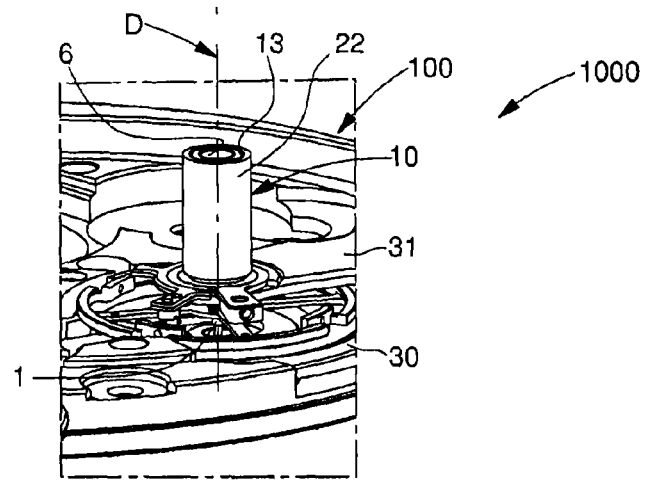
FIG. 8 shows a schematic, partial and perspective view of a timepiece including a movement that incorporates a magnetic pivot according to the invention, particularly in accordance with the embodiments of FIG. 6 or 7.

For example, this shielding means 20 includes at least one tubular part 21, 22 centred on pivot axis D and surrounding the first pole piece 4 and second pole piece 6, and at least the second end 3 of component 1 as seen in FIGS. 6, 7 and 8.

In the electrostatic variant, in a similar manner, the material of component 1 is selected, and the electrification, as appropriate, of first pole piece 4 and second pole piece 6 on the one hand, and/or component 1 on the other hand, is fixed such that the first electrostatic field and the second electrostatic field exert on component 1 attraction forces that are at least 30% greater than the gravitational force of attraction on component 1 and preferably five to ten times greater than the gravitational force of attraction on component 1, in order to obtain the best behaviour when the timepiece is moving.

FIGS. 3, 4 and 6 illustrate the direct support of component 1 on surface 5 of first magnetic pole piece 4. FIG. 7 illustrates an indirect support where the first end 2 of component 1 is resting on a surface 5 belonging to a connecting piece 18, which itself rests on the first pole piece 4 or in immediate proximity thereto, so as not to reduce the effect of the magnetic or electrostatic attraction field, as appropriate, exerted between component 1 and pole piece 4. Likewise, where connecting pieces 18, 19 are used, or surface treatments on surfaces 5, 7 of pole pieces 4 and 6, the materials of these connecting pieces or of these treatments, the treatment methods, and sizing, especially in thickness, should be selected so as not to reduce the effect of the magnetic or electrostatic attraction field, as appropriate, exerted between first end 2 of component 1 and pole piece 4 on the one hand, and between the second end 3 of component 1 and second pole piece 6 on the other hand.

Preferably, at least first surface 5 includes a hard coating or is formed by a hard surface of a connecting piece 18, which is inserted between first pole piece 4 and component 1. A similar connecting piece 19 may be inserted between second pole piece 6 and component 1.

Device 10 further advantageously includes magnetic or respectively electrostatic field loop means, between first pole piece 4 and second pole piece 6, for example via an external clamp. FIG. 12 of a magnetic variant shows the first pole piece 4 magnetically integral with a first arm 41 made of ferromagnetic material, the second pole piece 6 magnetically integral with a second arm 42 made of ferromagnetic material, which is pressed onto a pole of a magnetic source 40, which may be a magnet or similar element, the first arm 41 being pressed onto the other pole of said magnetic source 40. Shielding means 20 is then inserted between the magnetic source 40 and the field of cooperation of component 1 and pole pieces 4 and 6 in direction D. This configuration may be applied to all of the cases considered: magnetically permeable component 1 and magnetic pole pieces 4 and 6, magnetic component 1 and magnetically permeable pole pieces 4 and 6, and magnetic component 1 and magnetic pole pieces 4 and 6. This field transfer, which is show here as lateral, but which may occupy any other configuration in space, in particular according to the volume available in a timepiece movement or in a timepiece, allows a field transmitted at a distance from this area to be transferred to pivot direction D. It offers the advantage of enabling the field sources to be of much larger dimensions, regardless of whether they are magnetic or electrostatic in nature.

In another embodiment, the attraction between pole pieces 4, 6 and component 1 is electrostatic in nature. The design described here for magnetic attraction remains valid. However, it is more difficult to ensure sufficient electrostatic charge to obtain electrostatic forces and torques that are much greater than gravitational forces and torques and derived from the mechanism with which component 1 cooperates.

In another embodiment, the attraction between pole pieces 4, 6 and component 1 is electrostatic in nature. The notion of relative permittivity or dielectric constant is then substituted for the notion of magnetic permeability, and the notion of electrostatic field is substituted for that of magnetic field. The design of guide device 10 is entirely similar and is sized according to the permanent electrostatic fields set up between component 1 and pole pieces 4 and 6.

In this version, guide device 10 concerns the protection of a timepiece component 1 made of material that is at least partially conductive or at least partially electrized at a first end 2 and at a second end 3. According to the invention, this guide device 10 includes, on both sides of said first and second ends 2 and 3, at a greater air-gap distance, by the value of a determined operational play J, than the distance of centres between first end 2 and second end 3, a first surface 5 of a first pole piece 4 and a second surface 7 of a second pole piece 6, wherein the poles pieces 4, 6 are arranged either each to be attracted by an electrostatic field transmitted by one of first end 2 or second end 3 of component 1, or each to generate an electrostatic field attracting one of first end 2 or second end 3 of component 1, such that the electrostatic attraction forces being exerted on component 1 at the two ends 2, 3 thereof are of different intensity, so as to attract component 1 via one of the two ends thereof, into direct or indirect contact on only one of surfaces 5, 7 of the pole pieces 4, 6. The electrostatic fields are of different intensity at first end 2 and second end 3.

According to a particular realisation, the first pole piece 4 and second pole piece 6 can each move in a chamber between two stop members 41, 42, or 43, 44 respectively.

In short, in this embodiment, which relies on electrostatic forces and torques, it is possible to use a conductive material either for component 1, if pole pieces 4 and 6 are electrized and charged with sufficient energy, or for pole pieces 4 and 6, if it is component 1 which is electrized and charged. This conductive material is polarised by induction owing to the parts which are permanently charged. A similar variant is obtained with the use of an insulating or semi-conductor dielectric instead of a conductor. Polarisation is then limited to the surface of the dielectric and the force and torque of attraction are lower than those developed when the material is conductive, but still permit this use for a watch.

It is also possible, in another embodiment, to combine the action of electrostatic forces and torques and magnetic forces and torques.

The invention further concerns a magnetic or respectively electrostatic pivot 100 including a timepiece component 1 of this type, made of material that is at least partially magnetically permeable or respectively at least partially magnetic, and/or of material that is at least partially conductive or respectively at least partially electrized, wherein said component is pivotally mounted in a chamber 1A between a first end 2 and a second end 3 of said component 1.

Magnetic or respectively electrostatic pivot 100 includes a device 10 for guiding the pivoting of timepiece component 1 including, at an air-gap distance E which is greater, by the value of a determined operational play J, than the distance of centres L between first end 2 and second end 3, a first surface 5 of a first pole piece 4 and a second surface 7 of a second pole piece 6. These pole pieces 4, 6 are arranged either each to be attracted by a magnetic or respectively electrostatic field emitted by one of first end 2 or second end 3 of component 1, or each to generate a magnetic or respectively electrostatic field attracting one of first end 2 and second end 3 of component 1. These magnetic or respectively electrostatic fields are of different intensity from each other, such that the magnetic or respectively electrostatic attraction forces being exerted on component 1 at the two ends 2, 3 thereof are of different intensity, so as to attract component 1 via one of the two ends 2, 3 thereof into direct or indirect contact on only one of surfaces 5, 7 of pole pieces 4, 6.

Preferably, this magnetic pivot 100 includes a guide device 10 as described in one of the variants hereinbefore. It further includes a component 1, comprising a substantially shaft-like portion made of material that is at least magnetically or respectively electrostatically permeable, or at least magnetic or respectively electrostatic, extending between a first end 2 and a second end 3 and together defining a longitudinal axis D1. Guide device 10 includes access means for inserting component 1 into the air gap. Or guide device 10 can be dismantled into several parts that include means for cooperating with each other and/or with a bridge 31 and/or a plate 30 to enable component 1 to be assembled resting via the first end 2 thereof on a first part, which includes first surface 5 and first pole piece 4, prior to the assembly of a second part, which includes second surface 7 and second pole piece 6.

In a particularly advantageous manner, as seen in FIGS. 8 and 9, component 1 has a spindle-shaped portion 8, rotating about longitudinal axis D1, whose section decreases from the centre of gravity of component 1 towards second end 3, so as to improve the magnetic field gradient in proximity to second surface 7, and to facilitate the centering of second end 3 on pivot axis D.

When magnetic pivot 100 includes a component 1 belonging to an oscillator, advantageously component 1 is dynamically balanced, for maximum pivoting velocity, about longitudinal axis D1.

Preferably, the first end 2 of component 1 is arranged with a surface having limited contact with first surface 5, the limited contact surface being locally spherical or conical.

Advantageously, the first surface 5 includes a receiving surface arranged to cooperate with first end 2. The receiving surface is hollow and locally spherical or conical.

In a preferred application to an oscillator, component 1 is a balance whose pivot axis D coincides with longitudinal axis D1.

For maximum efficiency of the invention, if the shaft-like portion of component 1 is made of ferromagnetic or magnetised material, or includes areas made of this type of material, in the direction of longitudinal axis D1 of component 1, it is advantageous for the rest of component 1 to be made of amagnetic or magnetically inert material, for example silicon, or in a material having a relative magnetic permeability of less than 1.0001 and made, in particular, in MEMS or LIGA or similar technology, or even in an at least partially amorphous material. In the particular case of a balance, at least the felloe and the arms are preferably made of this type of material, as is the balance spring associated therewith. Thus there is no reciprocal interference between the oscillator and the device 10 for pivotal guiding. Advantageously, all of the mobile components close to ends 2 and 3 of the component are made in this type of amagnetic material.

An embodiment with a single-piece, silicon sprung balance including, either a magnetic arbour or arbour made of magnetically permeable material passing through the main axis of inertia, or two semi-arbours that are magnetic or made of magnetically permeable material, aligned on both sides of the balance on the same axis, is particularly advantageous.

Magnetic pivot 100 may adopt three configurations:

It includes a component 1 including a substantially shaft-like portion made of magnetically permeable material, and the first pole piece 4 and second pole piece 6 are each made of magnetic material.

It includes a component 1 comprising a substantially shaft-like portion made of magnetic material, and the first pole piece 4 and second pole piece 6 are each made of magnetically permeable material.

It includes a component 1 comprising a substantially shaft-like portion made of magnetic material, and the first pole piece 4 and second pole piece 6 are each made of magnetic material.

Naturally, it is possible to create a configuration with fields of a different nature at the two ends of component 1, magnetic at one end and electrostatic at the other.

Figure 14:
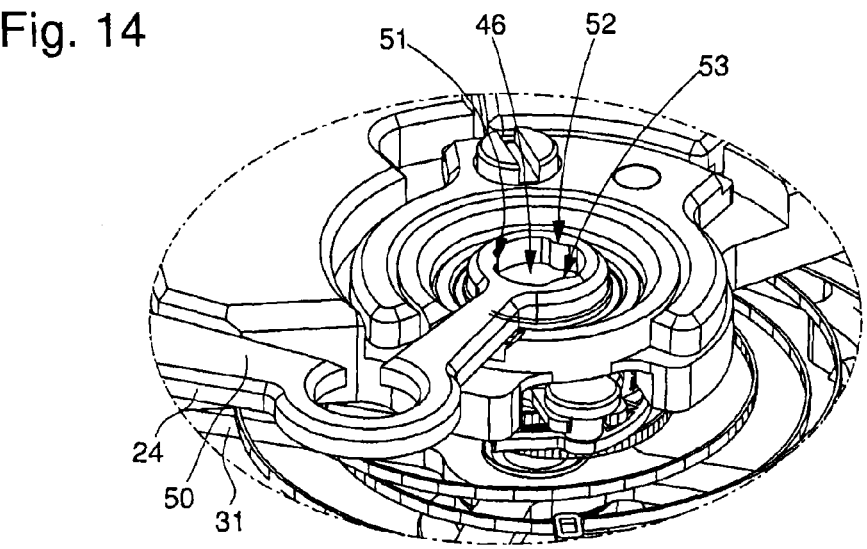
FIG. 14 shows a schematic, partial and perspective view of a damping element of the variant of FIG. 13.

FIGS. 13 and 14 illustrate an advantageous embodiment, owing to its great compactness, and the small total thickness which enables it to be used in a movement or timepiece of small thickness.

Pivot 100, which is illustrated here as magnetic, includes a damping assembly.

Support surface 18A is a polished, concave, spherical sector made in a jewel 18. The jewel is pressed onto a permanent magnet 4, which develops a remanent magnetic field preferably higher than 1 Tesla. Opposite jewel 18, relative to magnet 4, there is arranged a support jewel 43 with a polished convex profile. Jewel 18, magnet 4 and support jewel 43 are inserted together in a setting 40, made for example of beryllium copper. Preferably, jewel 19 and support jewel 46 are mounted in setting 40 by tightening or bonding, or by holding means ensuring a hold greater than 1N. This setting 40 slides freely in a block 41, which has an opening 34 for the passage of first end 2 of component 1, formed here by a sprung balance assembly. This block 41 includes, in proximity to opening 34, a radial anti-shock member or a radial shock-absorber 32, formed in particular by a shoulder that rotates around axis D.

The assembly is assembled such that the first end 2 of component 1 can move in abutment in the convex dome 18A and such that the convex sector of support jewel 43 is at the other end. This external block 41 acts as a stop member during shocks to component 1.

Preferably, the first end 2 of the component or balance 1 has a curvature, which is less than that of the concave calotte of jewel 18, so as to ensure contact on a single bridge. The concave curvature 18A of jewel 18 decreases the air-gap distance between magnetic pole piece 6 and first end 2 of component 1 and thus also forms a reservoir for the oil.

A similar assembly is placed at second end 3 of component 1. Support surface 19A is a polished, concave, spherical sector made in a jewel 19. The jewel is pressed onto a permanent magnet 6, which develops a remanent magnetic field preferably higher than 1 Tesla. Opposite jewel 19, relative to magnet 4, there is arranged a support jewel 46 with a polished convex profile. Jewel 19, magnet 6 and support jewel 46 are inserted together in a setting 44, made for example of beryllium copper. This setting 44 slides freely in a block 45, which has an opening 35 for the passage of second end 3 of component 1. Block 45 includes, in proximity to opening 35, a radial anti-shock member or radial shock-absorber 33, formed, in particular, by a shoulder that rotates around axis D. The assembly is assembled such that the second end 3 of component 1 can move in abutment in the convex dome 19A and such that the convex sector of support jewel 46 is at the other end. FIG. 4 illustrates this end assembly at second end 3 which is damped by a shock-absorber formed by an elastic shock proof arm 50. This elastic arm 50, as seen in FIG. 5, is fixed to a plate 30 or a bridge 31. It has a free end, which abuts on the convex calotte of support jewel 46, via at least one contact surface and, in this preferred example, via three contact areas 51, 52, 53 arranged in a triangle. Thus the force is perfectly distributed and the axial holding of the carrier assembly for second pole piece 6 is ensured. This type of elastic shock proof arm is preferably mounted with pre-stress on the order of 0.5N.

It is clear that the same assembly may be positioned, symmetrically, abutting on support jewel 43, in proximity to the first end 2 of component 1.

Magnets 4 and 6 are preferably permanent Nd—Fe—B magnets, for instance <<Vacodym®>> by <<Vacuumschmelze GmbH>>.

The invention also concerns a timepiece movement 1000 including at least one device 10 for pivotal guiding of this type, and/or at least one magnetic and/or electrostatic pivot 100 of this type.

The invention also concerns a timepiece including at least one timepiece movement 1000 of this type, and/or at least one device 10 for pivotal guiding of this type, and/or at least one magnetic or respectively electrostatic pivot 100 of this type.

What is claimed is:

1. A method for orienting a timepiece component to guide the pivoting of said component, the component including a shaft-like portion which includes at least two areas made of a ferromagnetic material and arranged in a direction of a longitudinal axis, wherein said two areas made of ferromagnetic material are positioned at a first end and a second end of said shaft-like portion according to said longitudinal axis, and, on both sides of said first and second ends, on a first and a second pole piece, respectively, a first and a second magnetic field, respectively are created, in the same direction and in opposite senses, each tending to attract said component onto said respective pole piece, and an unbalance is created between said first and second magnetic fields around said component, so as to create a differential in the forces thereon in order to press one of said ends of said component onto a contact surface of one of said pole pieces and to hold the other of said ends at a distance from a contact surface of the other pole piece, said unbalance between said magnetic fields being created around an air gap formed by a space comprised between said contact surfaces, and wherein said magnetic fields are asymmetrical relative to each other.

2. The method for orienting the pivoting of a timepiece component according to claim 1, wherein said first magnetic field is created with an intensity different from the intensity of said second magnetic field.

3. The method for orienting the pivoting of a timepiece component according to claim 1, wherein said first magnetic field and said second magnetic field are created each having revolution symmetry about a common pivot axis, and said pole pieces are arranged around said pivot axis, and said first magnetic field is created with a density in proximity to said first end which is greater than the density of said second magnetic field in proximity to said second end, so as to attract said first end into contact with said first pole piece, and wherein the air gap between said pole pieces is greater, by the value of a determined operational play, than the distance between said first end and said second end.

4. A device for guiding pivoting of a timepiece component, said component including a shaft-like portion which includes at least two areas made of a ferromagnetic material and arranged in a direction of a longitudinal axis, said two areas made of ferromagnetic material are positioned at a first end and a second end of said shaft-like portion according to said longitudinal axis, wherein said device includes, at a greater air-gap distance, by the value of a determined operational play, than the distance between said first end and said second end, a first surface of a first pole piece and a second surface of a second pole piece, wherein said poles pieces are each arranged to generate a magnetic field attracting one of said first end or said second end of said component, such that the magnetic attraction forces being exerted on said component at the two ends thereof are of different intensity, so as to attract said component via only one of said two ends thereof, into direct or indirect contact on only one of said surfaces of said pole pieces, said different intensity between said magnetic fields being created around said air gap formed by a space comprised between said contact surfaces, and wherein said magnetic fields are asymmetrical relative to each other.

5. The device according to claim 4, wherein said first magnetic field has an intensity different from the intensity of said second magnetic field.

6. The device according to claim 4, wherein the magnetic permeability of the material of said component, and the magnetization of said first pole piece and said second pole piece, are determined such that said first and said second magnetic fields exert on said component attraction forces that are at least ten times greater than the gravitational force of attraction on said component.

7. The device according to claim 4, wherein at least said first surface includes a hard coating or is formed by a hard surface of a first connecting piece allowing the magnetic field to pass and inserted between said first pole piece and said component.

8. The device according to claim 4, wherein at least said second surface includes a hard coating or is formed by a hard surface of a second connecting piece allowing the magnetic field to pass and inserted between said second pole piece and said component.

9. The device according to claim 4, wherein said air-gap distance between said first surface and said second surface is dimensioned to ensure said determined operational play over the entire range of temperatures of use of said guide device and of said component, and wherein said determined operational play is greater than or equal to 0.020 mm.

10. The device according to claim 4, wherein said first pole piece and said second pole piece are each made of magnetic material and together define a pivot axis on which said longitudinal axis of said component is aligned, when said component is inserted between said first pole piece and second pole piece.

11. The device according to claim 10, wherein said first pole piece generates, in proximity to said first surface, a first magnetic field along said pivot axis, which tends to move said first pole piece closer to said first end, and which is of greater density than the density of a second magnetic field along said pivot axis, said second magnetic field being generated in proximity to said second surface by said second pole piece, wherein said second magnetic field tends to move said second pole piece closer to said second end, such that said first end is held in contact with said first surface, and such that said longitudinal axis of said component coincides with said pivot axis, and said second end remains at a distance from said second surface.

12. The device according to claim 4, wherein the magnetic field density in proximity to said first surface and to said second surface is greater than or equal to 100,000 A/m.

13. The device according to claim 10, further comprising shielding means arranged to prevent the action of any magnetic field with a radial component relative to said pivot axis, in proximity to said first and second contact surfaces.

14. The device according to claim 13, wherein said shielding means includes at least one tubular part coaxial with said pivot axis and surrounding said first pole piece and said second pole piece and at least said second end of said component.

15. The device according to claim 4, wherein said device includes magnetic field loop means between said first pole piece and said second pole piece.

16. The device according to claim 15, wherein said loop means include an external clamp, said first pole piece is magnetically integral with a first arm made of ferromagnetic material, said second pole piece is magnetically integral with a second arm made of ferromagnetic material, said second arm being pressed onto a pole of a magnetic source or of a magnet, said first arm being pressed onto the other pole of said magnetic source or said magnet, respectively.

17. A timepiece movement including at least one device for pivotal guiding according to claim 4.

18. A magnetic pivot including a timepiece component made of material which is, or at least partially magnetically permeable with a magnetic relative permeability comprised between 100 and 10,000, or at least partially magnetic and able to be magnetized so as to have a remanent field comprised between 0.1 and 1.5 Tesla, wherein said component includes a shaft-like portion which includes at least two areas made of a ferromagnetic material and arranged in a direction of a longitudinal axis of said component, and said two areas made of ferromagnetic material are positioned at a first end and at a second end of said shaft-like portion according to said longitudinal axis, and said magnetic pivot includes a device for guiding the pivoting of said timepiece component, said device including, at a greater air-gap distance, by the value of a determined operational play, than the distance between said first end and said second end, a first surface of a first pole piece and a second surface of a second pole piece, wherein said poles pieces are each arranged to generate a magnetic field attracting one of said first or second ends of said component, such that the magnetic attraction forces being exerted on said component at the two ends thereof are of different intensity, so as to attract said component via only one of the said two ends thereof, into direct or indirect contact on only one of said surfaces of said pole pieces, and wherein said different intensity between said magnetic fields is created around said air gap formed by a space comprised between said contact surfaces, and wherein said magnetic fields are asymmetrical to each other.

19. The magnetic pivot according to claim 18, wherein said magnetic fields are of different intensity from each other.

20. The magnetic pivot according to claim 18, wherein said first magnetic field and said second magnetic each have a revolution symmetry about a common pivot axis, and said pole pieces are arranged around said pivot axis, and said first magnetic field has a density in proximity to said first end which is greater than the density of said second magnetic field in proximity to said second end, so as to attract said first end into contact with said first pole piece, and wherein the air gap between said pole pieces is greater, by the value of a determined operational play, than the distance between said first end and said second end.

21. The magnetic pivot according to claim 18, wherein, outside said shaft-like portion, the rest of said component is made of amagnetic or magnetically inert material.

22. The magnetic pivot according to claim 18, wherein said guide device includes access means for inserting said component into said air gap, or is dismountable into several parts including means for cooperating with each other and/or with a bridge, and/or a plate, to enable said component to be mounted resting, via said first end thereof, on a first part including said first surface and said first pole piece, prior to the assembly of a second part including said second surface and said second pole piece.

23. The magnetic pivot according to claim 18, wherein said component has a spindle-shaped portion rotating about said longitudinal axis, whose section decreases from the center of gravity of said component towards said second end, so as to improve the magnetic field gradient, in proximity to said second surface, and to facilitate the centering of said second end on said pivot axis.

24. The magnetic pivot according to claim 18, wherein said first end of said component is arranged with a limited contact surface with said first surface, wherein said limited contact surface is spherical or conical.

25. The magnetic pivot according to claim 18, wherein said first surface includes a receiving surface arranged for cooperating with said first end, wherein said receiving surface is hollow and locally spherical or conical.

26. The magnetic pivot according to claim 18, wherein said first pole piece and said second pole piece are each made of magnetic material.

27. The magnetic pivot according to claim 18, wherein said component is a balance or a sprung balance wherein the pivot axis coincides with said longitudinal axis.

28. The magnetic pivot according to claim 27, wherein at least a felloe and arms of said balance are made of magnetically inert material, or silicon, or a material with very low magnetic permeability, and/or made using MEMS or LIGA technologies, or in an at least partially amorphous material, and wherein said balance includes an arbour made of magnetically permeable material, passing through the main axis of inertia thereof, or two semi arbours aligned on both sides of said balance on the same axis, and made of magnetically permeable material.

29. A timepiece including at least one timepiece movement according to claim 17.

* * * * *

UNITED STATES PATENT AND TRADEMARK OFFICE
CERTIFICATE OF CORRECTION

PATENT NO. : 10,018,967 B2
APPLICATION NO. : 14/667040
DATED : July 10, 2018
INVENTOR(S) : Sylvain Marechal et al.

It is certified that error appears in the above-identified patent and that said Letters Patent is hereby corrected as shown below:

In the Specification

In Column 6, Line 25, delete "Nm." and insert --A/m. 2--, therefor.

Signed and Sealed this
Twenty-first Day of April, 2020

Andrei Iancu
*Director of the United States Patent and Trademark Office*